(12) United States Patent
Dupont et al.

(10) Patent No.: US 8,770,128 B2
(45) Date of Patent: Jul. 8, 2014

(54) FACILITY IN PARTICULAR FOR PRODUCING AND PROCESSING FLUIDS, INCLUDING A FLOATING UNIT PROVIDED WITH A SYSTEM FOR SINGLE-POINT MOORING

(75) Inventors: Bernard Dupont, Eaubonne (FR); Cyrille Dechiron, Le Pecq (FR)

(73) Assignee: Technip France, Courbevoie (FR)

( * ) Notice: Subject to any disclaimer, the term of this patent is extended or adjusted under 35 U.S.C. 154(b) by 197 days.

(21) Appl. No.: 13/515,858

(22) PCT Filed: Dec. 1, 2010

(86) PCT No.: PCT/FR2010/052588
§ 371 (c)(1),
(2), (4) Date: Jul. 17, 2012

(87) PCT Pub. No.: WO2011/086251
PCT Pub. Date: Jul. 21, 2011

(65) Prior Publication Data
US 2013/0032072 A1    Feb. 7, 2013

(30) Foreign Application Priority Data

Dec. 23, 2009    (FR) ..................................... 09 59542

(51) Int. Cl.
*B63B 21/50*    (2006.01)
(52) U.S. Cl.
CPC ................................... *B63B 21/507* (2013.01)
USPC .................................................... 114/230.12
(58) Field of Classification Search
CPC .... B63B 21/508; B63B 21/507; B63B 21/26; B63B 22/026; B63B 27/24
USPC ...................... 114/230.12, 230.13; 441/3, 4, 5
See application file for complete search history.

(56) References Cited

U.S. PATENT DOCUMENTS

| | | | |
|---|---|---|---|
| 5,178,087 A | 1/1993 | O'nion et al. | |
| 5,755,531 A | 5/1998 | Ribas Ferreira et al. | |
| 5,893,334 A | * 4/1999 | Poranski, Sr. ............. | 114/230.12 |
| 7,063,032 B2 | * 6/2006 | Lindblade et al. ........ | 114/230.12 |
| 7,225,749 B2 | * 6/2007 | Boatman ................... | 114/230.12 |
| 7,513,208 B1 | * 4/2009 | Seaman et al. ............ | 114/230.12 |

FOREIGN PATENT DOCUMENTS

| | | |
|---|---|---|
| WO | WO 99/38763 A1 | 8/1999 |
| WO | WO 03/016127 A1 | 2/2003 |

OTHER PUBLICATIONS

European Patent Office, International Search Report in International Patent Application PCT/FR2010/052588 (Apr. 19, 2011).

\* cited by examiner

*Primary Examiner* — Stephen Avila
*Assistant Examiner* — Anthony Wiest
(74) *Attorney, Agent, or Firm* — Leydig, Voit & Mayer, Ltd.

(57) ABSTRACT

A facility for producing and processing fluids, including a boat with a system for rotatable single-point mooring via a turret pivotably mounted in a shaft which extends vertically through the hull of the boat. The turret includes an upper portion having a rotary device for receiving and supporting incoming fluid-transfer pipes, and an upper bearing, smaller in diameter than the shaft, positioned between a head portion of the upper portion of the turret and a supporting structure connected to the hull of the vessel. The upper bearing of the turret is located above the rotary device for receiving and supporting the incoming fluid-transfer pipes.

23 Claims, 16 Drawing Sheets

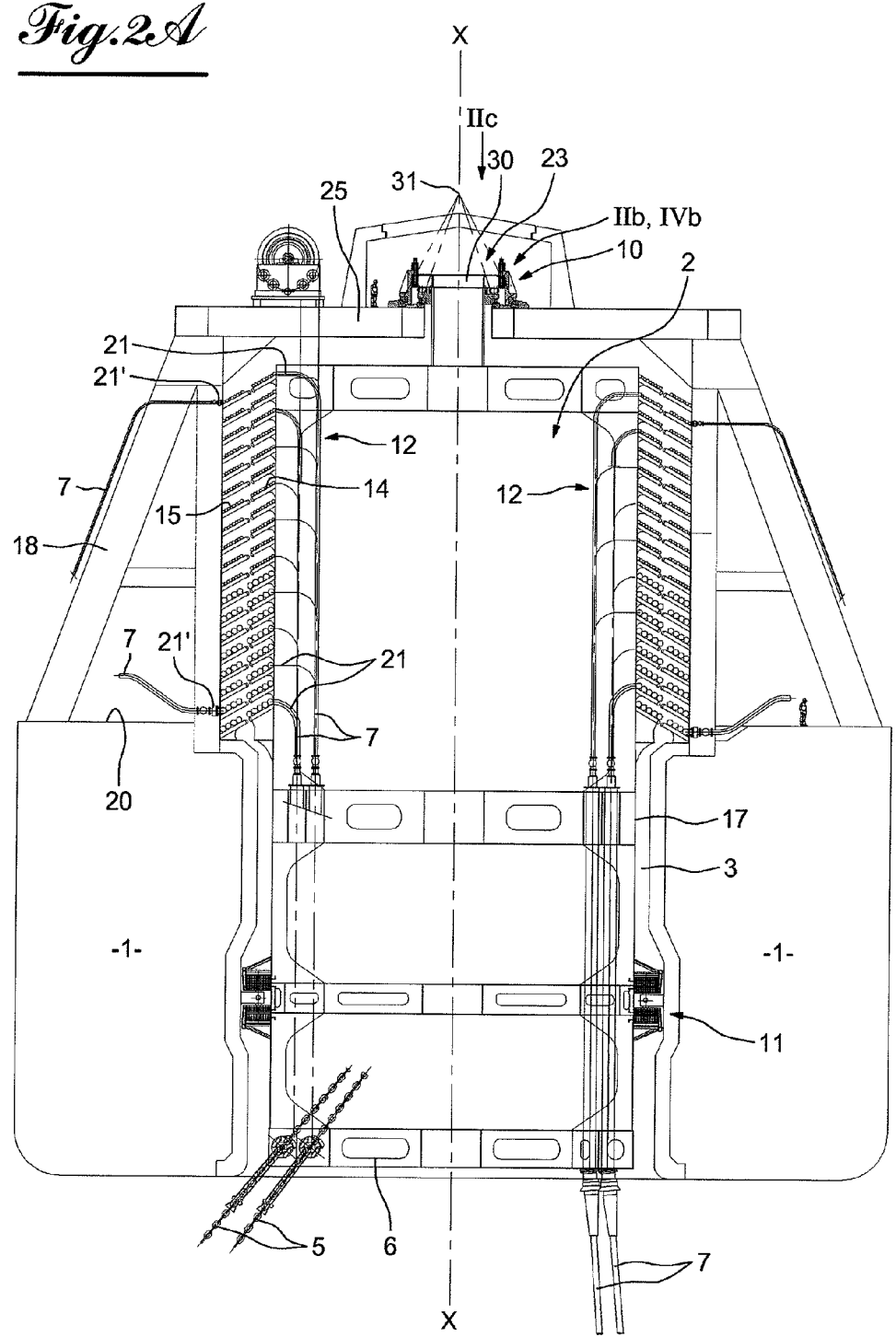

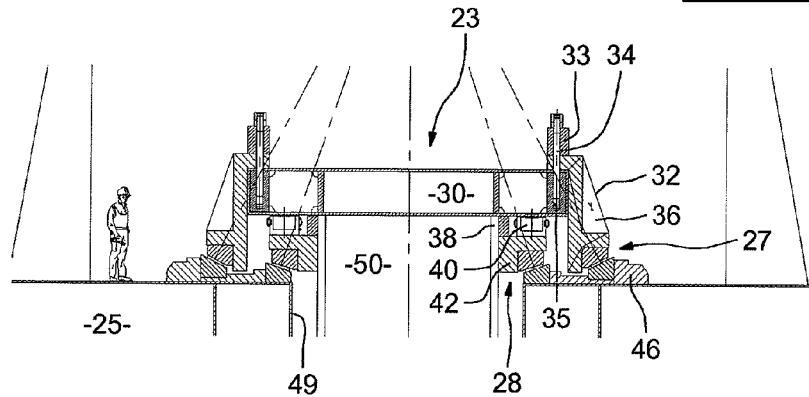
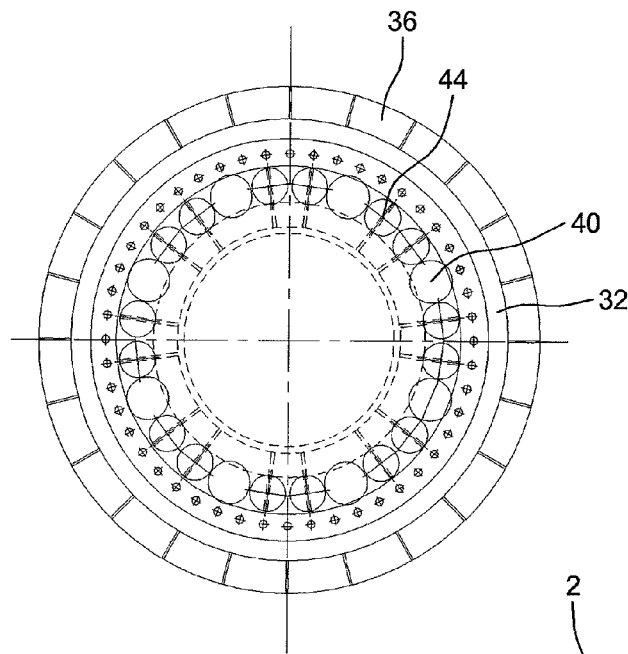
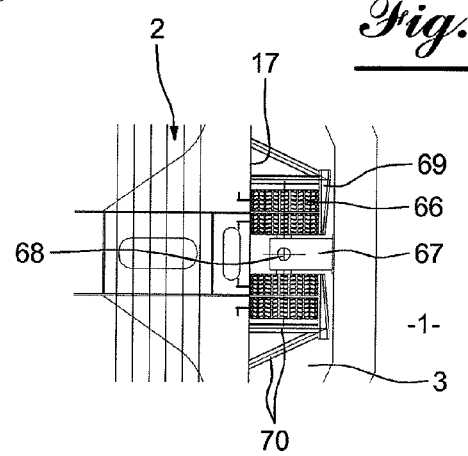

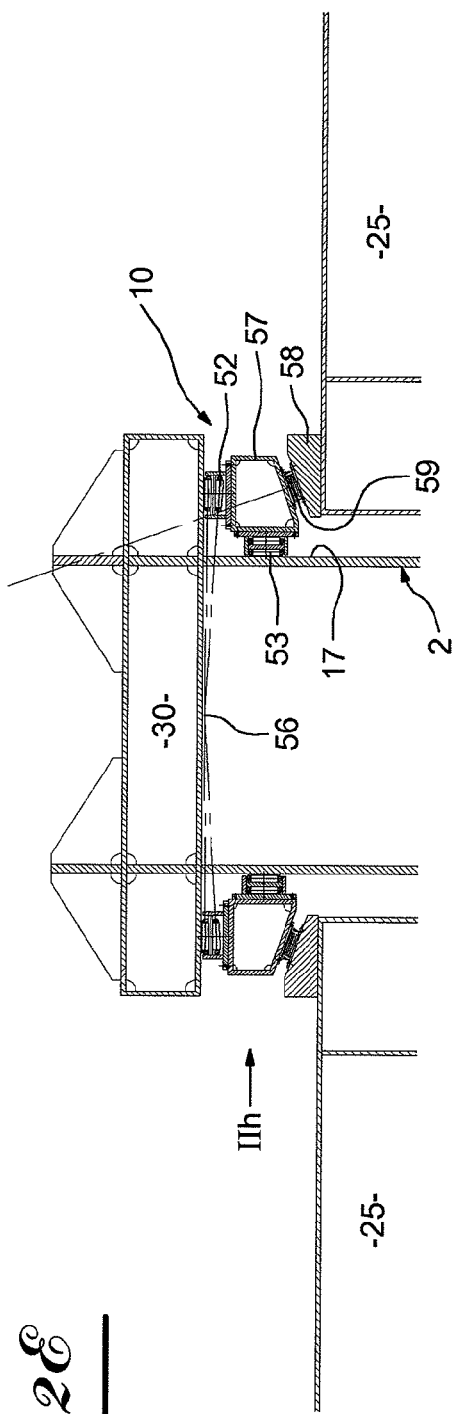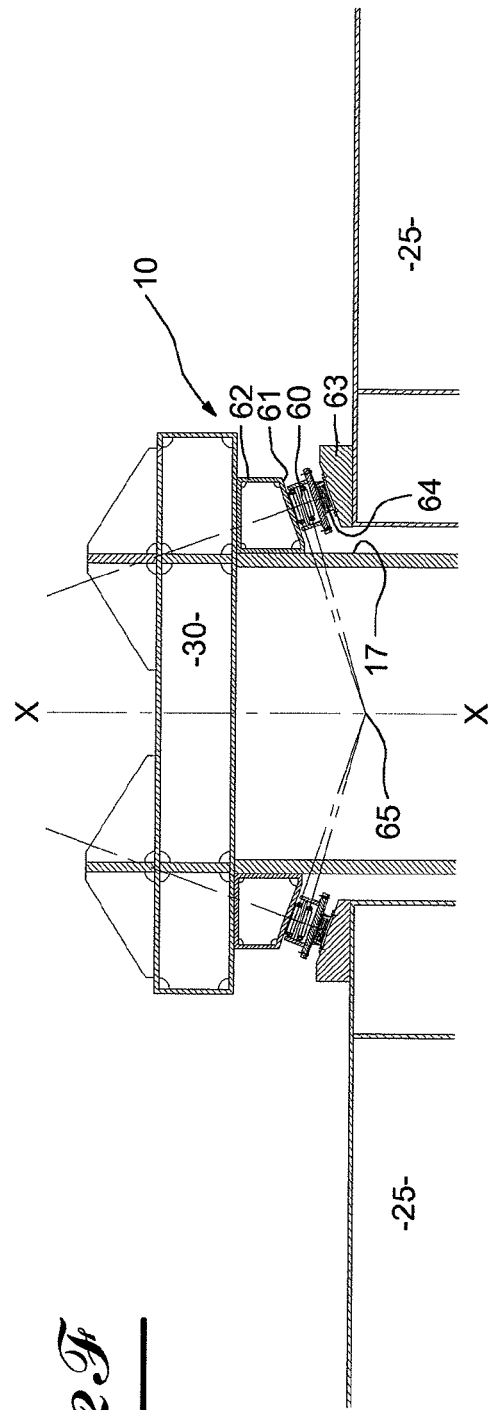

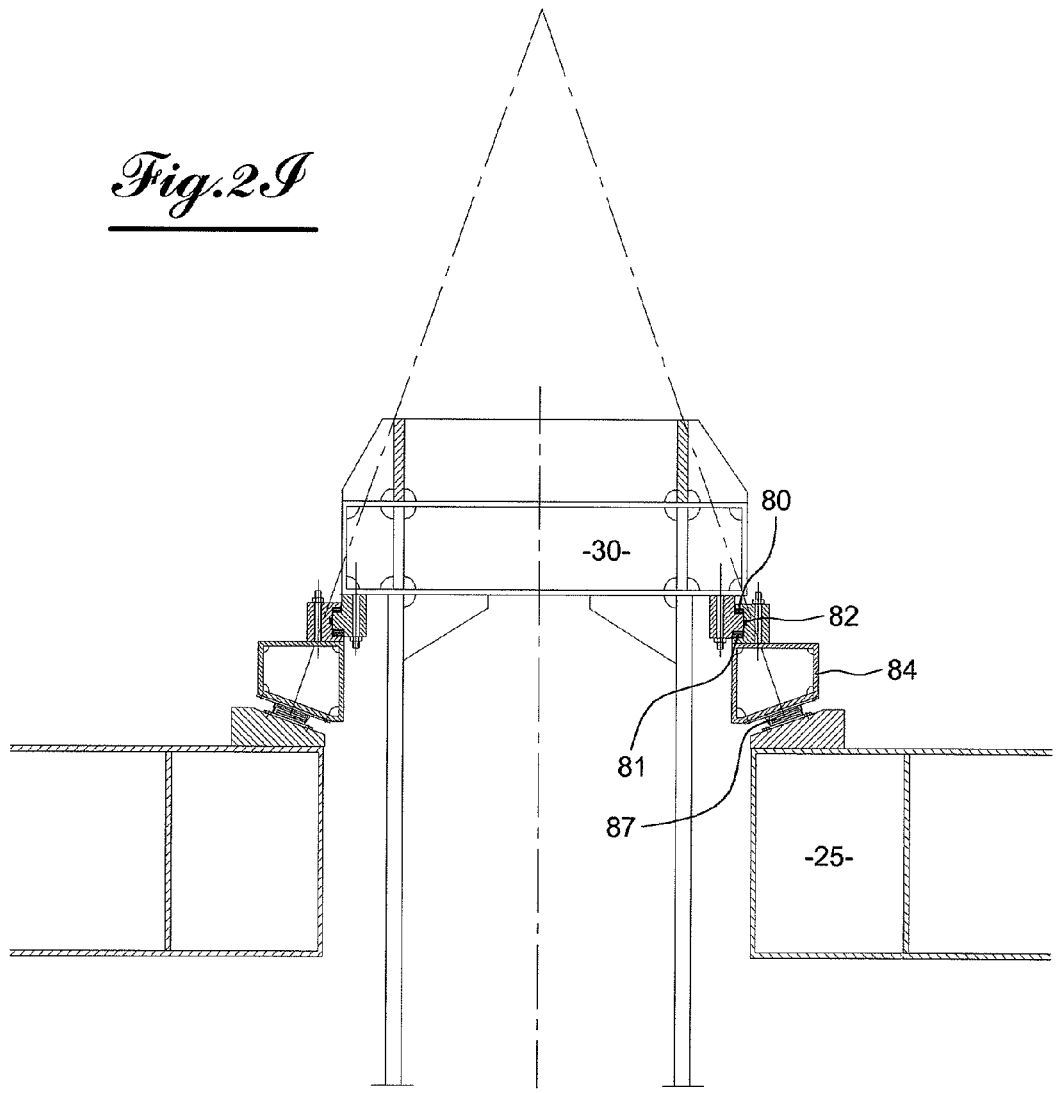

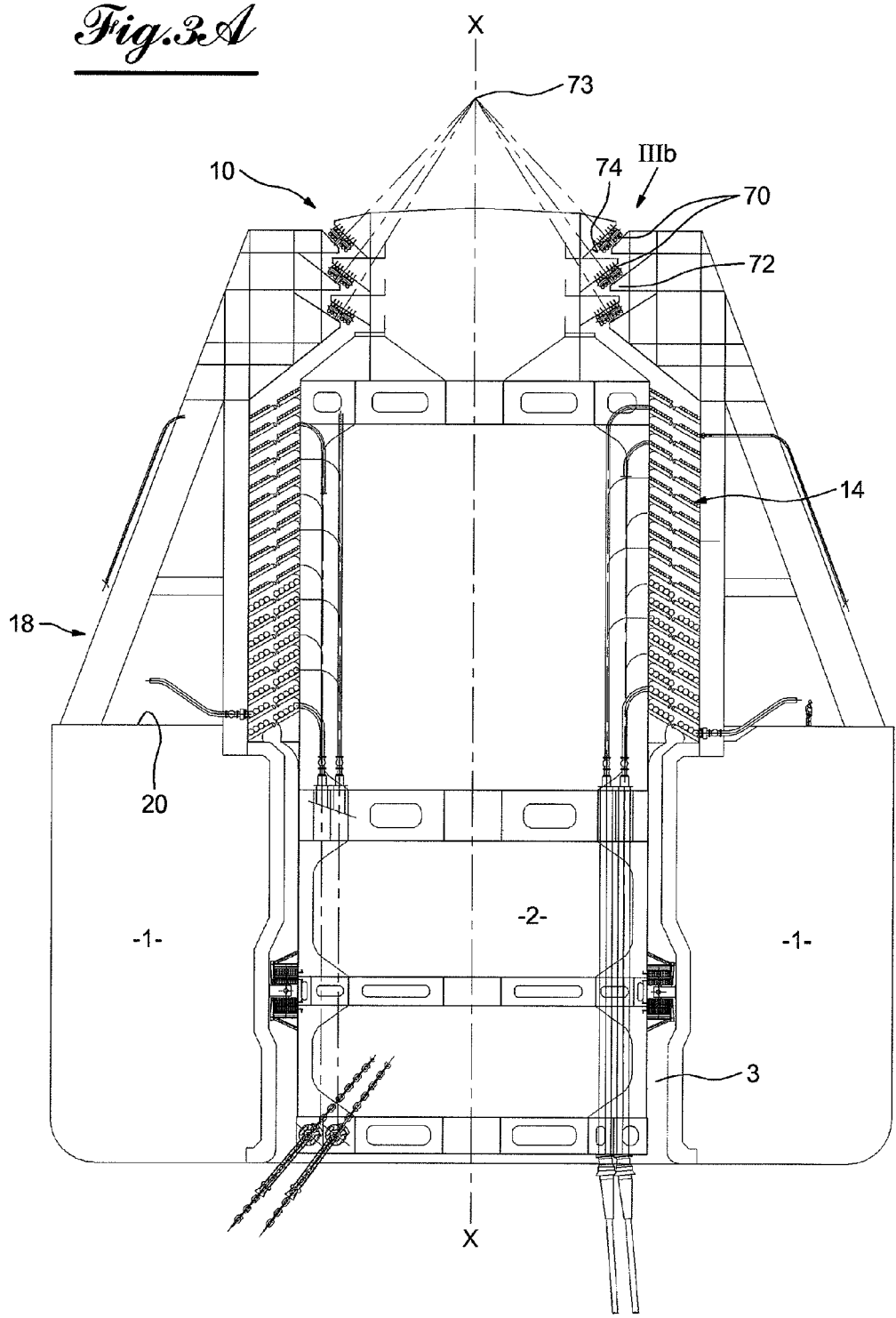

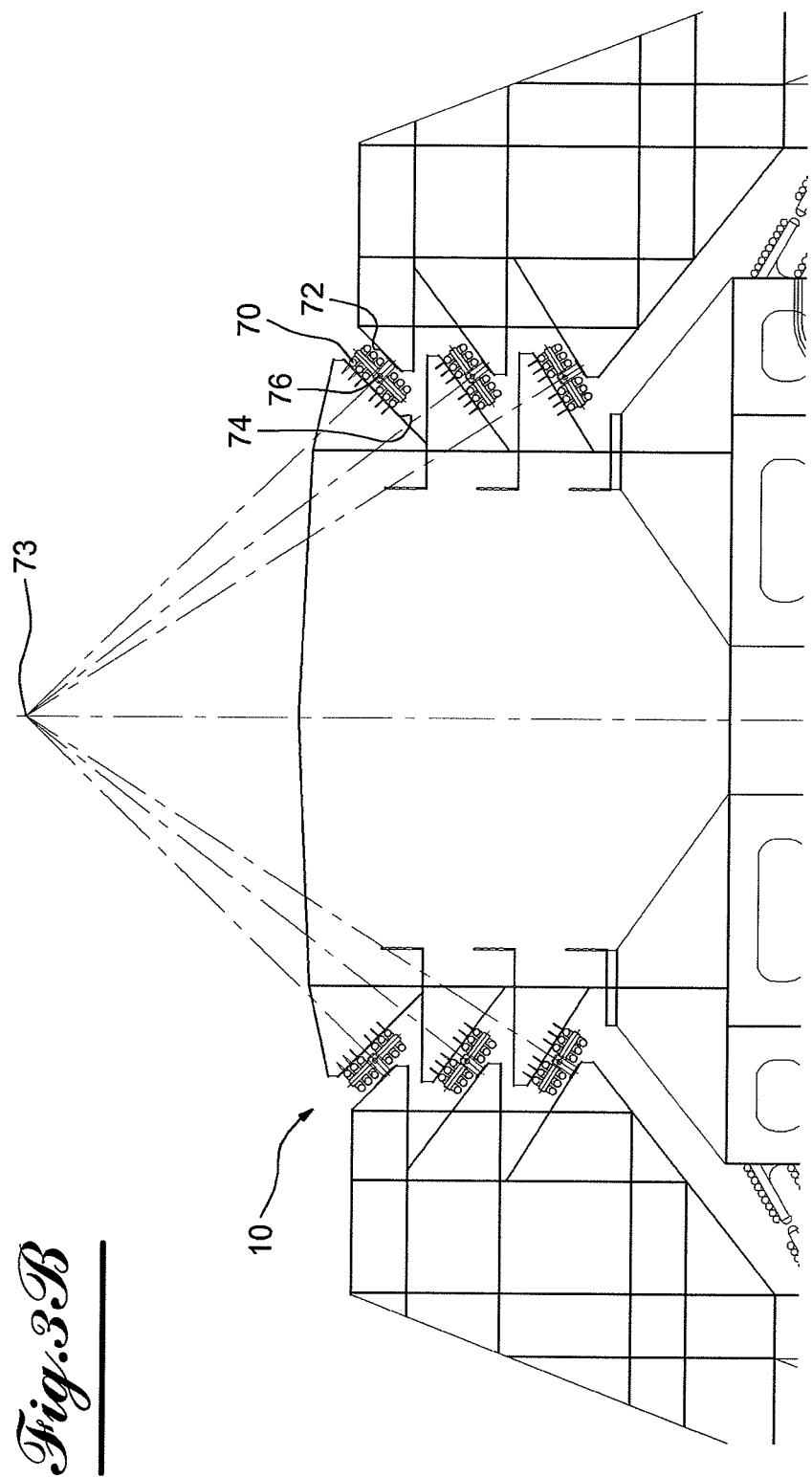

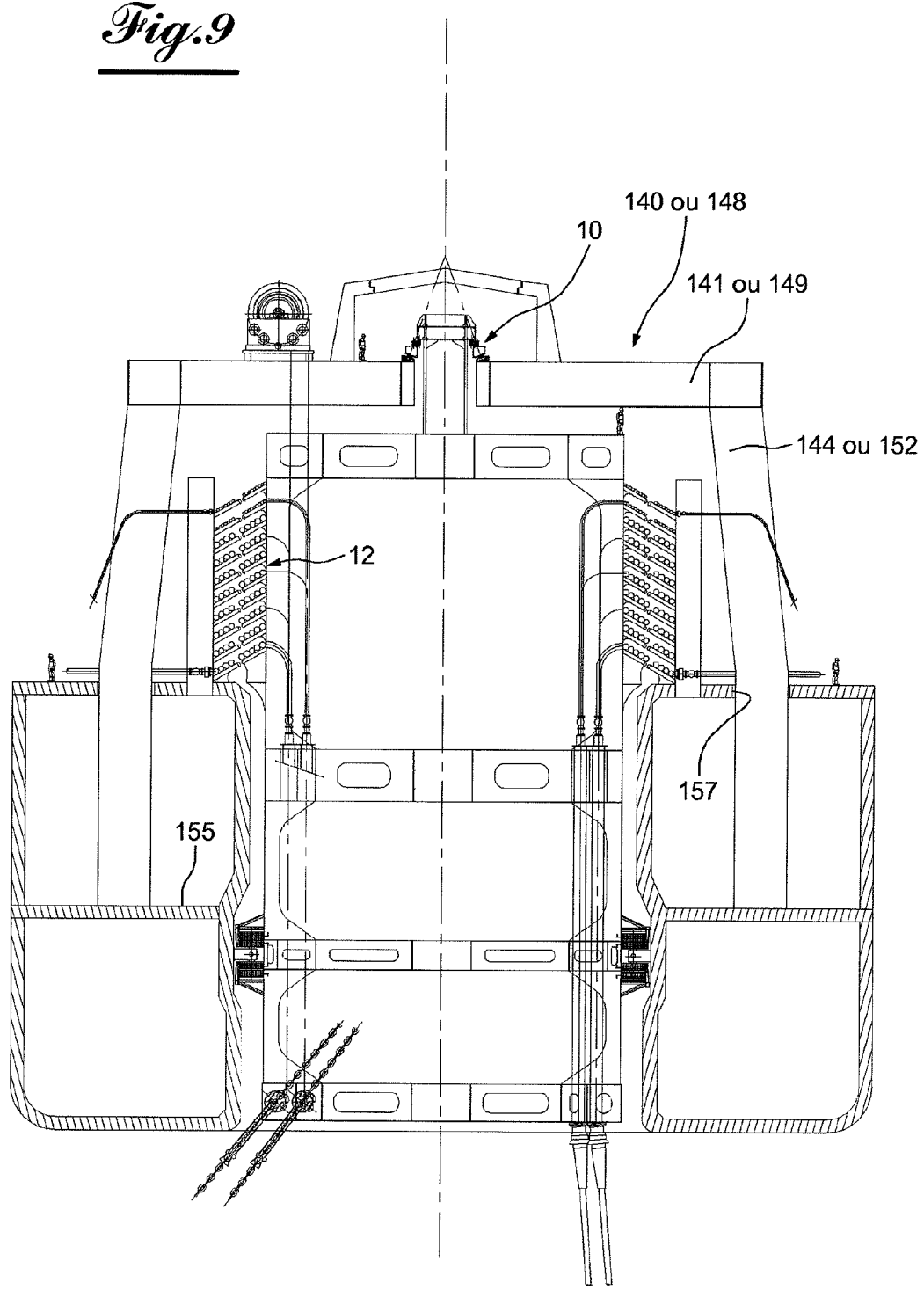

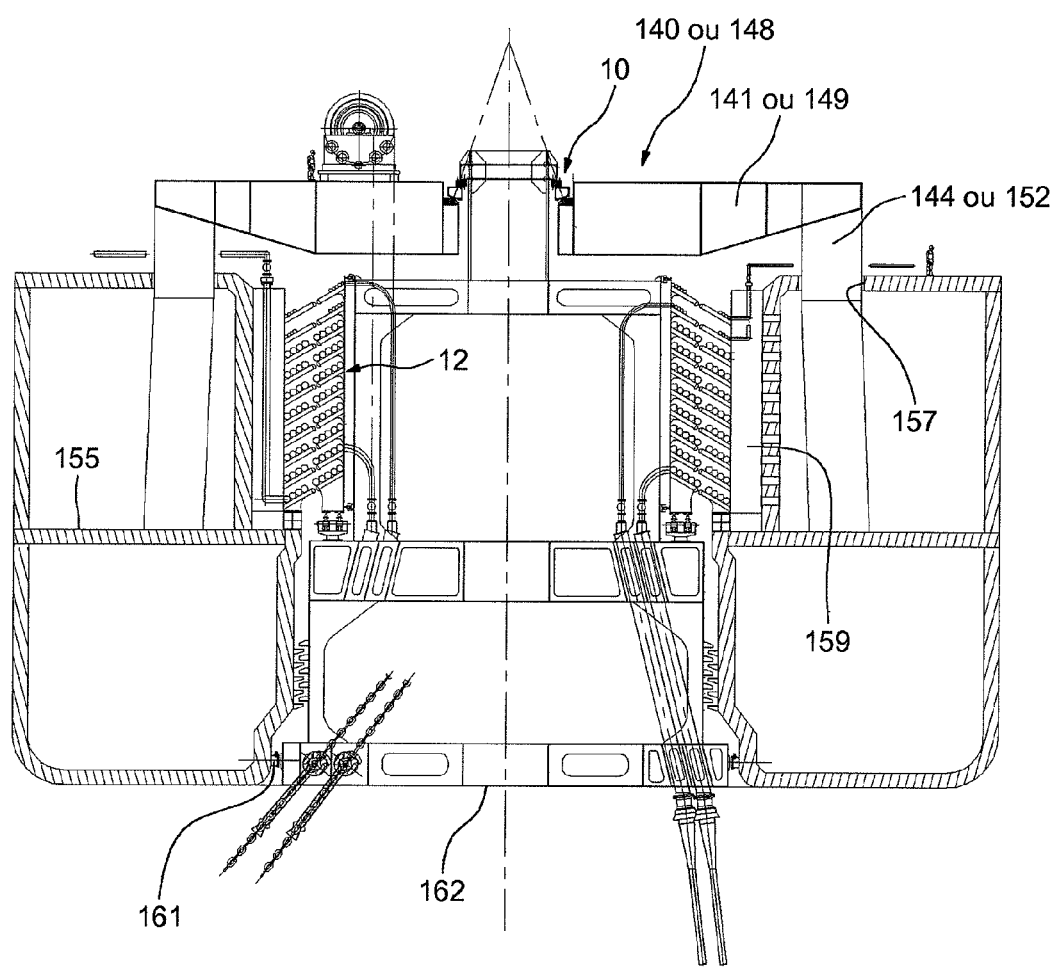

FACILITY IN PARTICULAR FOR PRODUCING AND PROCESSING FLUIDS, INCLUDING A FLOATING UNIT PROVIDED WITH A SYSTEM FOR SINGLE-POINT MOORING

FIELD OF THE INVENTION

The invention concerns a facility in particular for producing and processing fluids, such as petroleum, of the type comprising a floating unit, such as a vessel provided with a rotating single-point mooring system formed by a turret pivotally mounted in an opening in the form of a shaft extending vertically through the hull of the floating unit moored to the seabed, and through which fluid-transfer pipes pass to transfer fluid to the equipment of the floating unit, the mooring system comprising devices guiding the turret in the shaft and which comprise axial and radial bearing means.

BACKGROUND

In facilities of this type, the axial bearing usually has a large diameter since it is arranged close to or on the edge of the shaft, and in the form of one or more axially superimposed rings around the pipes. The shaft may effectively be of large diameter when it is required to pass through the turret a large number of fluid-transfer pipes. However, the manufacture of bearings of suitably large diameter is complicated, and, in addition, consideration must be given at the designing stage to major structural deformations, subsidence, or out-of-round deformation. The manufacture of bearing and carrier structure assemblies therefore proves to be difficult, and the preparation of bearing raceways in particular to obtain the required planarity and their installation entail numerous constraints.

SUMMARY OF THE INVENTION

It is the objective of the invention to propose a solution to this problem.

To achieve this objective, the facility of the invention is characterized in that the turret comprises an upper portion which includes a rotating device for receiving and supporting incoming fluid-transfer pipes, and in that a bearing of smaller diameter than the diameter of the shaft is positioned between a head portion of the upper part of the turret and a structure connected to the hull of the floating unit, the upper bearing of the turret being located above the said rotating device for receiving and supporting the fluids.

According to one characteristic of the invention, the facility is characterized in that it comprises a radial bearing which is arranged in the shaft, between the outer cylindrical peripheral surface of the turret and the wall delimiting the shaft, advantageously at a level at least above the minimum water level to allow inspection or other possible servicing, and advantageously also as low as possible for the closest transmission of horizontal forces derived from the mooring and flexible undersea pipes.

According to another characteristic of the invention, the facility is characterized in that the upper bearing of reduced diameter is inter-positioned between a bearing member of the head portion of the turret, advantageously disc-shaped, and the supporting structure connected to the vessel, advantageously a platform of which part may be conical.

According to another characteristic of the invention, the facility is characterized in that the upper bearing comprises two bearing rings namely an interchangeable main bearing and a temporary bearing adapted to ensure the functioning of the facility if the main bearing is out of order.

According to another characteristic of the invention, the facility is characterized in that the two bearings are arranged at radially different locations, the main bearing advantageously being located on the outside in particular for replacement thereof.

According to a further characteristic of the invention, the facility is characterized in that the two bearings, main and temporary, are superimposed along the axis of the turret, the main bearing advantageously being located uppermost in particular for replacement thereof.

According to a further characteristic of the invention, the facility is characterized in that the upper bearing is a radial bearing in the form of a sliding swivel allowing the rotation and also the lateral tilting movement of the turret relative to its vertical axis.

According to a further characteristic of the invention, the facility is characterized in that at least one of the bearings is in the form of a single-piece ring provided with lifting jacks to remove this bearing from service when needed for replacement by another ring.

According to a further characteristic of the invention, the facility is characterized in that at least one of the upper bearings comprises a ring of modules with advantageously conical recirculating roller bearings, forming an axial bearing, and a ring of modules with cylindrical recirculating rollers forming a radial bearing, the two rings bearing upon a ring-shaped structure supported on elastomeric pads or on sliding swivel supports on the supporting structure of the vessel.

According to a further characteristic of the invention, the facility is characterized in that at least one of the upper bearings comprises a ring of modules with advantageously conical recirculating rollers on a conical raceway, which bears upon the supporting structure of the vessel via elements advantageously of elastomeric pad type.

According to a further characteristic of the invention, the installation is characterized in that at least one of the upper bearings is formed by a plurality of rings superimposed in the direction of the axis of the shafts and formed by elements moving on conical surfaces whose lines orthogonal to the surfaces intersect at a point on the axis of the shaft, above the turret.

According to a further characteristic of the invention, the facility is characterized in that the rings are formed by recirculating roller bearing modules.

According to a further characteristic of the invention, the facility is characterized in that the rings are formed by arrangements of elastically deformable wheels such as tyres or rollers with elastically deformable tread or pneumatic.

According to a further characteristic of the invention, the facility is characterized in that it comprises conical annular platforms, each comprising a platform element secured to the turret and a platform element secured to the support structure of the vessel, on which platforms the transfer pipes are placed in coils before being directed towards the vessel equipment, and in that the upper bearing is arranged above the transfer pipe device comprising the platforms and the pipes.

According to a further characteristic of the invention, the facility is characterized in that the incoming transfer pipes are connected in the head portion of the turret to rotary fluid-collecting joints, and in that to each of these joints there is a connected a fluid transfer pipe leading to the vessel equipment.

According to a further characteristic of the invention, the installation is characterized in that the radial bearing comprises rotation elements such as elastically deformable wheels whose axes extend parallel to the axis of the shaft, elements in particular with recirculating rollers, with wheels or bogies or similar mounted on spring or jack devices or as needed via suitable deformable structures.

According to a further characteristic of the invention, the facility is characterized in that the rotation elements in the form of wheels are mounted on supporting posts secured to the inner surface of the shaft and in rolling contact with the outer surface of the turret, and in that the turret comprises a second roller raceway which is coaxial to the outside surface of the turret, the wheels also being in contact with the inner surface of this second raceway.

According to a further characteristic of the invention, the facility is characterized in that the structure supporting at least one upper bearing is connected to one of the decks of the vessel at three main points, and adapted to uncouple the structure from the deformations and distortions of the vessel's hull.

According to a further characteristic of the invention, the facility is characterized in that this carrier structure is attached to or built in the vicinity of the neutral axis close to the mid-height of the vessel's hull where the aforementioned deformations and distortions are naturally weaker.

BRIEF DESCRIPTION OF DRAWING FIGURES

The invention will be better understood and other objectives, characteristics, details and advantages thereof will become more clearly apparent from the following explanatory description with reference to the appended schematic drawings given solely as examples illustrating several embodiments of the invention and in which:

FIG. 2A is a partial cross-sectional view in a vertical plane perpendicular to the longitudinal direction of the vessel, of a facility according to the invention;

FIG. 2B is a cross-sectional view on a larger scale of the part referenced IIB in FIG. 2A;

FIG. 2C is an overhead view in the direction of arrow IIC in FIG. 2A;

FIG. 2D is a cross-sectional view on a larger scale in the vicinity of the element 11 forming a lower radial bearing;

FIGS. 2E and 2F are similar views to FIG. 2B and show two other possible embodiments of a bearing at the head of the turret, according to the invention;

FIG. 2I is a similar view to FIGS. 2E and 2F and shows another possible embodiment of a bearing at the head of the turret;

FIG. 3A is a similar view to FIG. 2A of another version of embodiment of the facility according to the invention;

FIG. 3B is a view on a larger scale of the part indicated in FIG. 3A by the arrow IIIB;

FIGS. 9 and 10 are similar views to FIG. 2A and show two different versions of another embodiment of a facility according to the invention.

DETAILED DESCRIPTION

Figure 1:
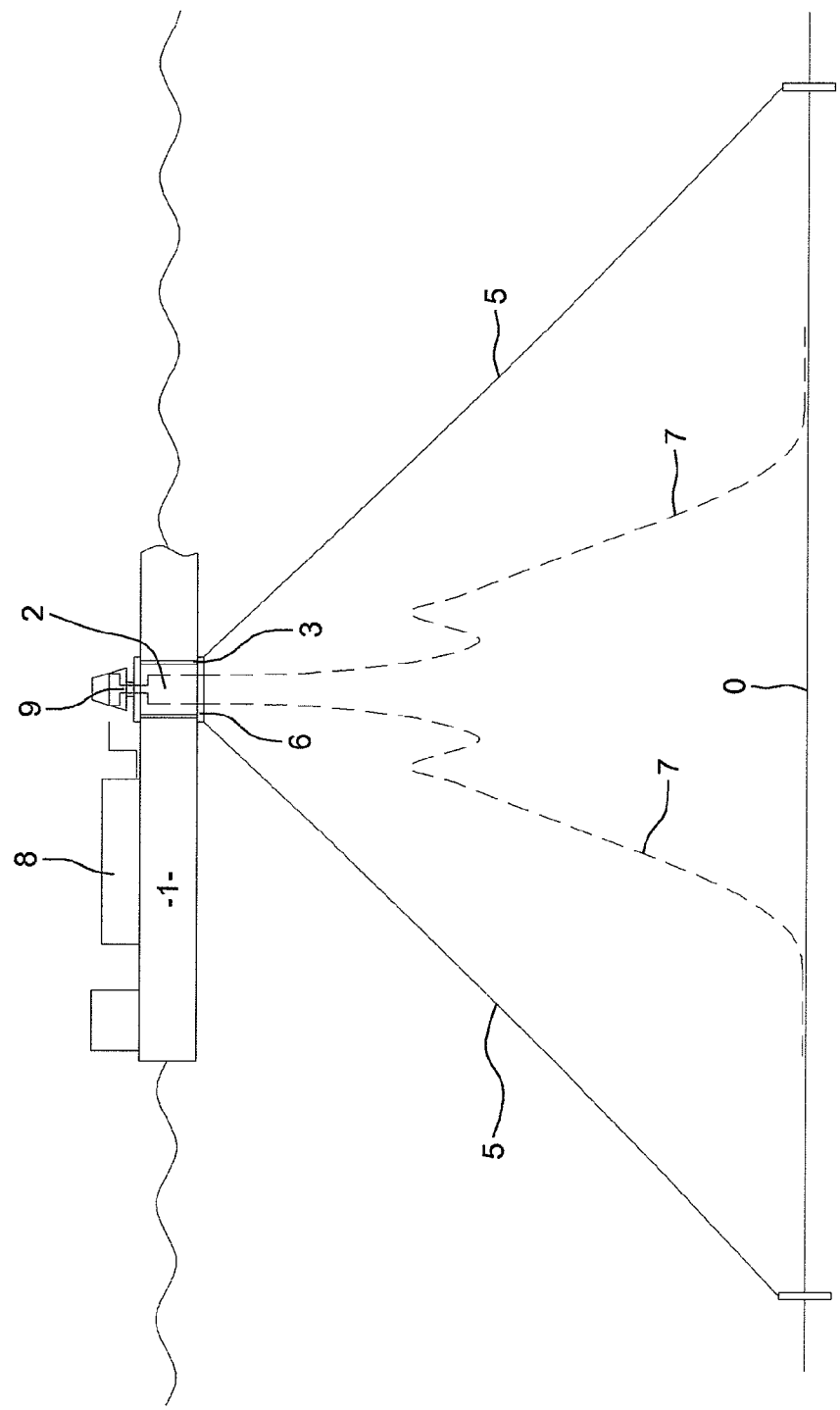
FIG. 1 is a schematic view of a floating unit such as a vessel provided with a rotating single-point mooring system via a turret moored to the seafloor.

The invention concerns a facility such as illustrated in FIG. 1. This facility essentially comprises a floating unit 1 for the production, storage and unloading of fluid such as oil or gas, which is moored by a rotating, single-point mooring system via a turret 2 which is pivotally mounted in an opening in the form of a shaft 3 and passes fully and vertically through the floating unit. The turret is moored to the seafloor 4 via cables, chains, or any other suitable means 5 the other end of which is secured to the base 6 of the turret for example. The figure shows two fluid transfer pipes 7 among the large number provided for optimal drilling of oil or gas fields. The lower ends of these pipes descend towards well-heads not illustrated, whilst the upper part of the pipes passes through the turret 2 to convey the fluid via the rotating fluid transfer device 9 towards different items of equipment schematically illustrated by reference 8 of the floating unit.

The turret 2 is guided in the shaft 3 by guiding arrangements which comprise an axial bearing device and a radial bearing device, whose configurations form the essential objective of the invention.

Figure 2G:
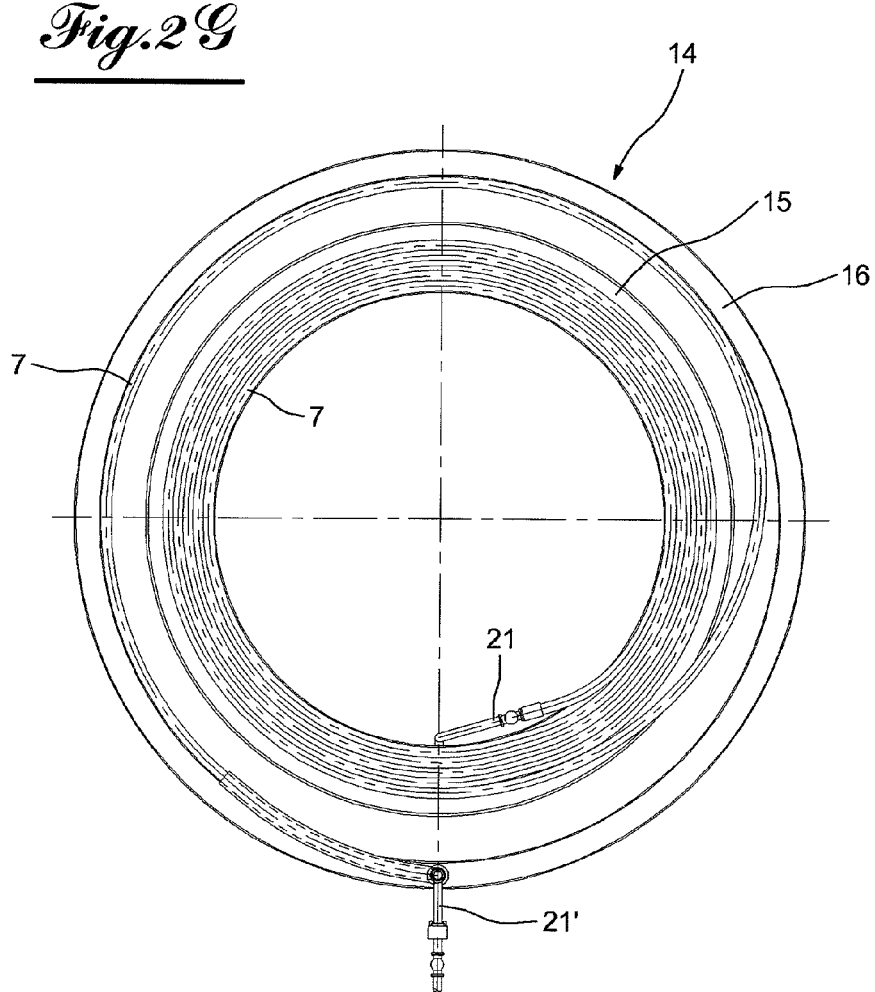
FIG. 2G is an overhead view on a coiling platform for one of the transfer pipes in FIG. 2A, indicated by the arrow IIG in FIG. 2A.

FIGS. 2A to 2G illustrate a first embodiment whose particularity essentially lies in the arrangement of the axial bearing 10. The bearing is located above the device 12 supporting and delivering the fluid transfer pipes 7 to the equipment 8 of the vessel. The device 12 comprises a large number of conical annular platforms 14 which are superimposed in the direction of the axis x-x of the turret and are each composed of a platform element 15 which is coaxially mounted on the peripheral cylindrical surface 17 of the turret 2, and a platform element 16 which is supported by a supporting structure in the form of a tower 18 mounted on the upper deck 20 of the vessel. The two elements 15 and 16 of each platform 14 are aligned and tilted downwardly from the cylindrical surface 16 of the turret. Each annular conical platform 14 is intended to store a flexible fluid transfer pipe 7. This pipe is stored coiled fashion on the platform so that the turret is freely able to carry out several rotations, for example five, about its axis. FIG. 2G illustrates the arrangement of a pipe 7 on an annular platform 14 formed by the two platform elements 15 and 16 respectively secured to the turret 2 and to the supporting tower 18. In FIG. 2G and according to the example in FIG. 2A, the pipe arrives on the platform at 21, after being axially lifted in the turret, and leaves the platform substantially radially at 21' for example via a bend in the vertical plane.

As can be clearly seen in FIG. 2A, the turret 3 which extends above the deck 20 over a substantial length to allow the mounting of the conical platforms 14, is surmounted by a head portion 23 which bears on an upper platform 25 located at the top of the support structure 18 of the vessel, via the bearing 10. The device 12 supporting the flexible pipes necessarily has a relatively large outer diameter imposed by the minimum optimal radius of curvature below which the pipes must preferably not be bent. According to the invention, the bearing 10 is located above the structure 12 supporting the flexible pipes 7 which are coiled on the conical platforms 14. It can then have a much smaller diameter than the diameter of the conical platforms 14 required by the curvature of the pipes, and just as independently it may have smaller diameter than the diameter of the shaft 3 imposed for example by a large number of undersea pipes. However, having regard to its installation at great height and to the radial forces retaining the floating unit right at the bottom of the turret, the bearing 10 can only have a reduced diameter provided it does not also take up stresses due to tilting of the turret relative to its vertical position, due in particular to the elasticity of the turret and that of the lower bearing. This condition is easily met for example if a swivel mounting is provided to relieve tilting stresses.

Another valid solution and conforming to the invention is to mount the lower bearing of large diameter adequately rigidly and the upper bearing of notably reduced diameter so that together they form a pivot, the axial upper bearing then acting as load-bearing abutment transmitting axial forces, without a swivel effect being essential.

According to the invention, the novel arrangement of the upper bearing 10 at height and having the smallest possible diameter, offers the advantageous possibility of conveying numerous fluid pipes which could not be envisaged with known arrangements of the axial bearings placed underneath or around the fluid transfer device, or on the deck 20 of the vessel around the shaft, and hence having a large diameter. In addition, placing the small diameter of the upper bearing well above the junction point with the vessel structure allows deformation-related problems to be solved, in particular out-of-round deformation around the shaft, by moving away from the latter vertically and by reducing the diameter of the bearing under consideration. In particular, the structure carrying the bearing at height can advantageously be designed with three feet which swivel at the base so as to obtain three-point vertical downward loading on the floating unit without creating exaggerated stresses in the feet themselves as shown in FIGS. 7 to 11.

In the field of the facilities according to the invention, it is required that the reliability of the bearings should be such that proper functioning is guaranteed over 25 to 30 years of uninterrupted service. From this constraint of reliability it follows that the manufacturers of turret guiding arrangements in the shaft must have strong experience to guarantee the design and manufacture of the bearings. In addition, not only is the designer of the global structure under constraints regarding rigidity, manufacture and assembly precision etc., but also the future operator of the equipment must integrate costly operations into operating expenses for regular monitoring and rigorous maintenance possibly requiring high qualifications.

With regard to the use of a bearing of reduced diameter such as is made possible by the invention, not only are these problems solved or significantly reduced, but in addition it is possible to envisage doubling the axial supporting function by nesting two bearings of different radius or vertically superimposing two bearings of similar bearing capacity. It then becomes possible to replace a worn or faulty swivel bearing by another swivel bearing without dismantling the pipes and without interrupting normal drilling operations. This is made possible through the absence of topological cross-over between the fluid pathway and the extraction trajectory of the replaceable upper bearing. Also, the reduction in diameter allows a smooth bearing to be envisaged for the upper bearing without generating too great friction torque on rotation, compatible with the moment capacity of the anchoring lines.

However, the arrangement with a doubled upper bearing gives rise to new requirements, in particular regarding the design of the two swivel bearings which must have the capacity each one alone to take up the entirety of the upper radial load and the global axial load. In the invention, the theoretical swivelling centres of the two bearings are advantageously tally with one another or they are very close. Therefore the invention makes provision for doubling the bearing and making the outer bearing or top bearing replaceable. For this purpose, the second bearing, radially inner or lower, does not take up the vertical load during normal operation of the system. However, it could also be envisaged to allow it the possibility of copying the movements of the main bearing to avoid any risk of mechanical jamming, but practically load-free and hence without any notable wear. The first bearing, or main bearing, located on the outside or on the top therefore takes up the entirety of the axial load and when needed the small upper radial load, continuously during normal operation of the assembly. However when it reaches its lifetime limit or design limit or suffers damage its replacement can be envisaged. Therefore during this replacement, and hence temporarily, it is the inner bearing which takes up the axial load and when applicable the radial load.

Associated with the swivel bearing 10, there is a lower radial bearing 11 positioned as low as possible to reduce tilting moments, but preferably above the minimum water line so that easier inspection or replacement can be envisaged.

FIGS. 2B to 2F illustrate several possibilities of embodiment of an upper swivel bearing 10 of reduced diameter, independent of and hence here notably smaller than the diameter of the global transfer system of fluids, pipes and rotary joints.

FIG. 2B shows an arrangement of an upper bearing 10 which comprises a bearing of interchangeable swivel type 27, for example in the form of a radially outer swivel ring, and a radially inner bearing 28 of non-interchangeable swivel type if it is made as a ring in a single-piece or advantageously interchangeable part-by-part if it is segmented. It is to be noted that the bearings 27 and 28 are adequately configured to take up the necessary axial stresses but without opposing resistance to the tilting movement of the turret relative to its vertical position due to the relative flexibilities of the structures and of the lower bearing.

The bearings 27 and 28 comprise bearing members which bear upon a bearing surface in the form of a domed cap. The centres of curvature of each one are superimposed and join up theoretically at 31 on the axis of the shaft above the turret.

For the housing of the bearing device 10, the head portion 23 of the turret (FIG. 2B) comprises an upper disc 30 which ensures transfer of the axial load from the turret to the main bearing 27 via a connecting part 32 in the form of a ring which is connected to the disc 30 via pre-stressed bolts 34 with an outer nut 33 and blind nut 35 secured to the disc. The connecting ring 32 comprises radial reinforcing ribs 36 and a radially projecting rim 37 via which the ring rests on the bearing 27.

The disc 30 is able to transfer axial loads onto the radially inner replacement bearing 28 via shimming members 38 that are discontinuous or ring-shaped and a plurality of lifting jacks 40 or any device ensuring the same function for maintenance or replacement operations, and via an inserted annular part 42. The shimming members and the jacks bear upon the upper horizontal surface of the annular part 42 whose lower radial and axial surfaces bear upon the bearing 28. As shown in FIG. 2C, the jacks 40 are distributed at equidistant angles around the axis of the turret. Between two jacks 40, two circular openings 44 are provided which are particularly intended to allow the hydraulic connecting or evacuation of the jacks.

The main bearing 27, on the side of the carrier structure secured to the vessel, is placed on a coaxial radial shimming part 46. This part is fixed onto the upper surface of the carrier platform 25 of the tower supporting the vessel. This platform has a cylindrical orifice 49 through which there extends a cylindrical part 50 of the turret head portion on whose free end the upper disc 30 is placed.

It follows from the foregoing that during necessary maintenance and/or replacement operations on the outer bearing 27, the jacking device 40 of high lifting capacity (for example having high hydraulic pressure) is actuated to lift the disc-shaped structure 30 of the turret. This vertical upward movement relieves the stress on the main swivel bearing 27 by transferring forces to the temporary bearing 28 which will operate during the entire replacement time of the main bearing. Load transfer takes place with guaranteed concurrent supporting forces by means of the matching pivot points and swivel points throughout the entire operation. It is therefore possible to de-pre-stress the assembly device formed by the bolts 34 and the connecting part 32 and to lower the disc structure through the controlled lowering of the jacks 40 until it comes to rest on the shimming ring 38, which then allows the extraction from above of the bolts, the connecting part 32 and finally the main outer bearing 27.

The reverse operation allows the reinstalling of a new swivel bearing, the placing of the main connecting ring 32 and the bolts 34, then the lifting of the disc 30 to pre-stress the bolts, and finally the re-positioning of the disc 30 which will then bear upon the new main bearing 27 via the connecting part 32 and no longer on the temporary bearing 28 via the intermediate shimming part 38.

It is to be noted that in this solution whereby the swivel bearing 10 is arranged at height, the reduction in diameter also provides a reduction in friction torques derived from this same bearing and thereby reduces the resistance of the assembly to rotation, which amounts to a design improvement and advantage when a large number of flexible pipes move by sliding and rub on the platforms for example. For example, it is even possible to use a smooth main bearing 27 of sliding swivel type even with strong axial and radial loads, in particular in deep fields or fields requiring numerous flexible pipes. It can also be envisaged that the temporary bearing 28 could be of sliding swivel type known to be very reliable. The sliding swivel can be formed for example of a pair of materials having good friction quality of bronze type with lubricant on stainless steel. The inner bearing 28 may be modular, for example in the form a segmented swivel bearing for part-by-part replacement, but the main outer bearing 27 is advantageously always in a single piece, for example a single-piece sealed sliding swivel bearing or a single-piece sealed ring of rollers so that the sliding or rolling elements are able to function in a protected lubricated medium to the benefit of their lifetime and reliable operation.

FIG. 2E illustrates a swivel bearing composed of recirculating rolling elements 52, 53, e.g., with recirculating rollers. Since they are modular, these modules are arranged in a ring in interchangeable manner.

Figure 2H:
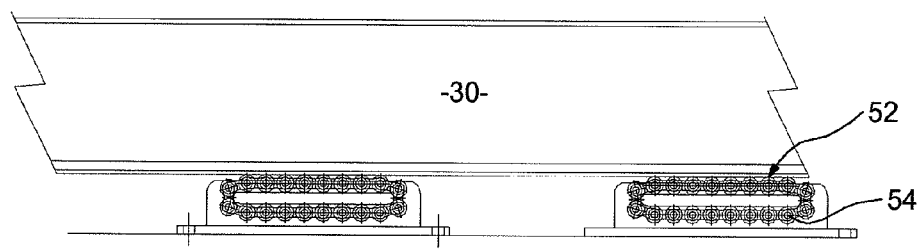
FIG. 2H is a side view of two recirculating roller bearing modules of the roller ring in the direction the arrow IIH in FIG. 2E.

These modules are known per se and used in general for moving heavy loads. As shown in FIGS. 2E and 2H, a module with recirculating rollers comprises a large number of rolling elements, e.g., radially cylindrical rollers 54 or advantageously axially conical which are connected at their ends to chains so that they are able to move around a support plate thereby causing integrated recirculation. Once it has arrived at the end of the support plate, the last retracted roller is conveyed by traction of the chain link elements to the front of the plate where it turns round and is again placed between the raceway and the plate. The use of said modules with recirculating rollers notably has the advantages that the independent elements take up little volume and are lightweight in comparison with the heavy load they carry, that they are easy to install and subsequently easy to handle. They allow a load to be well distributed on very numerous small rollers, as small as necessary.

In the invention, the axial 52 and radial 53 modules are arranged in a ring shape between the disc 30 of the turret and a rigidified support ring 57 which, on the other hand, is supported on a tilted backing ring 58 resting on the support platform 25 of the vessel support tower. Between the support ring 57 and backing ring 58 there is arranged an element 59 of tilting type, made either in the form of a complete ring bearing or in the form of discontinuous blocks. The element 60 is for example either of sliding swivel type in the tilting direction, or advantageously of reinforced elastomer type. The recirculation modules 53 are inserted between the outer cylindrical surface 17 of the turret and the cylindrical surface facing the ring 57. The modules 52 are of conical roller type, bearing on a planar raceway and therefore form an axial bearing, whilst the modules 53 also with rollers but here advantageously cylindrical rollers form a radial bearing. The axes of the conical rollers of the modules 52 intersect at a point 56 located on the axis of the turret and of the shaft.

The axial module 52 together with the radial module 53 form a modular slewing bearing which is mounted in an assembly swivelling in relation to the supports 25 and 58 by means of an assembly of elements 59 advantageously of elastomeric pads.

In the bearings, modules could be used whose backing plate is curved over a cone portion and on which the conical recirculating elements come to roll. These rollers can be provided at each axis end with a synchronizing chain, the outer chain having a larger pitch than the inner chain. Each module thus formed is mounted on a swivelling elastomeric pad or mounted on a continuous ring itself swivelling via pads of the same type on the platform 25.

FIG. 2F illustrates an upper bearing 10 which comprises modules with conical recirculating rollers 60 on a conical raceway 61 of a support ring 62 which is secured laterally against the peripheral surface of the turret and underneath the disc 30 thereof. The conical rollers 60 are arranged so that their axes intersect on the axis X-X of the shaft or of the turret to the shaft 65. The modules 60 bear upon an inclined backing ring 63 secured to the support platform 25 via elements 64 of elastomeric pad type.

FIG. 2D refers to FIG. 2A and concerns the radial bearing 11 inserted between the turret 2 and the wall delimiting the shaft 3, which is arranged as low as possible in the shaft to reduce tilting moments and advantageously just above the minimum water line for inspection and maintenance. It is formed, as shown in FIG. 2D, by a ring formed of succession of elastically deformable wheels 66 whose axles extend parallel to the axis of the shaft. These wheels may for example be tyres or wheels with elastically deformable or pneumatic tread. The wheels are mounted on supporting posts 67 which are secured to the peripheral surface of the floating unit, which delimits the shaft 3, and extend radially. The wheels are grouped in pairs. The wheels of each pair are arranged either side of the post 67, the supporting axle of the twinned tyres having the capacity to pivot perpendicularly to the axis of the tyres around a pin 68. Their axles are axially aligned. The wheels are in rolling contact with the outer cylindrical surface 17 of the turret.

To obtain better use of the wheels 66 an outer circular guide-way 69 is provided for the ring of wheels 66, this being secured to the turret and coaxial to the axis thereof via supporting cross-pieces 70, and therefore able to form an opposite inner guide-way for the wheels 66.

When the turret shifts radially from its position along the axis of the shaft, only the wheels on the side of the shift are compressed, whereas the diametrically opposite wheels are drawn away from the peripheral surface forming the guide-way of the turret. As a result, these wheels do not take part in the radial transfer of loads. It is to overcome this shortcoming that the radially outer guide-way 69 is provided. Since it is secured to the turret it causes compression also of the radially opposite, normally inactive wheels.

The wheels may also be mounted in another fully compatible manner without changing the principle of the invention, whereby the load does not pass through their hub (not illustrated, see French patent applications 09 56 599 and 09 56 618).

FIGS. 3A and 3B show another solution for an embodiment of the invention, based for example on tyres. However the proposed arrangements can also be compatible with wheels, rollers, bogies, smooth bearings, modules with recirculating rollers or similar mounted in rigid, optionally deformable or floating structures as described in French patent applications 09 56 599 and 09 56 618 not yet published on the date of filing of the present patent application and which belong to the applicant.

The facility in FIG. 3A also comprises conical platforms 14 on which the flexible pipes are coiled and the upper bearing is of reduced diameter compared with the shaft diameter and the diameter needed for passing rigid and flexible fluid transfer pipes in and around the turret. However unlike the illustration in FIG. 2A, the bearing 10 comprises a plurality of rings 70 each of which is formed by an arrangement of elastically deformable and laterally juxtaposed wheels whose axles are common and carried by a platform 72 of the vessel support structure. Each platform 72 is tilted downwardly in the direction of the axis of the shaft. The tilt angle of the three platforms 72 for the three rings 70 is such that the lines orthogonal to the platforms intersect at a common point 73 located on the axis X-X above the head of the turret.

The head of the turret, for each ring 70, carries a platform 74 whose lower surface located opposite the platform 70 is tilted in matching manner and forms a raceway of conical rollers for the tyres of the ring 70.

In FIGS. 3A and 3B the upper bearing 10 has a relatively steep slope and is formed of several modular rings superimposed along the axis of the shaft, each ring being made of an assembly of modules with twinned tyres on pivoting axles 76 similar to FIG. 2D.

FIG. 2J shows another version of embodiment of the upper bearing 10. In this case, the bearing is formed of a bearing with three rows of rollers 80, 81, 82 which are coaxial to the axis of the turret and spaced apart in the direction of this axis. The rollers of the rings 80 and 82 have a horizontal axis for axial and roll-over forces and the ring 82 is formed of rollers whose axes are vertical for radial forces. Each ring is inserted between two raceways of which one is secured to the turret and the other to a supporting ring 84 which bears upon a backing ring 85 of the platform 25 of the vessel support structure via reinforced elastomeric pads 87 capable of undergoing slight shear deformation, or via any other swivel arrangement in particular to follow the tilting of the turret due to alignment defects of the turret over a large height and possibly to movements at the lower bearing if this is elastic, and to remain unaffected by deformations of the structures of the floating units under the effect of external elements such as current, waves and wind.

Figure 4:
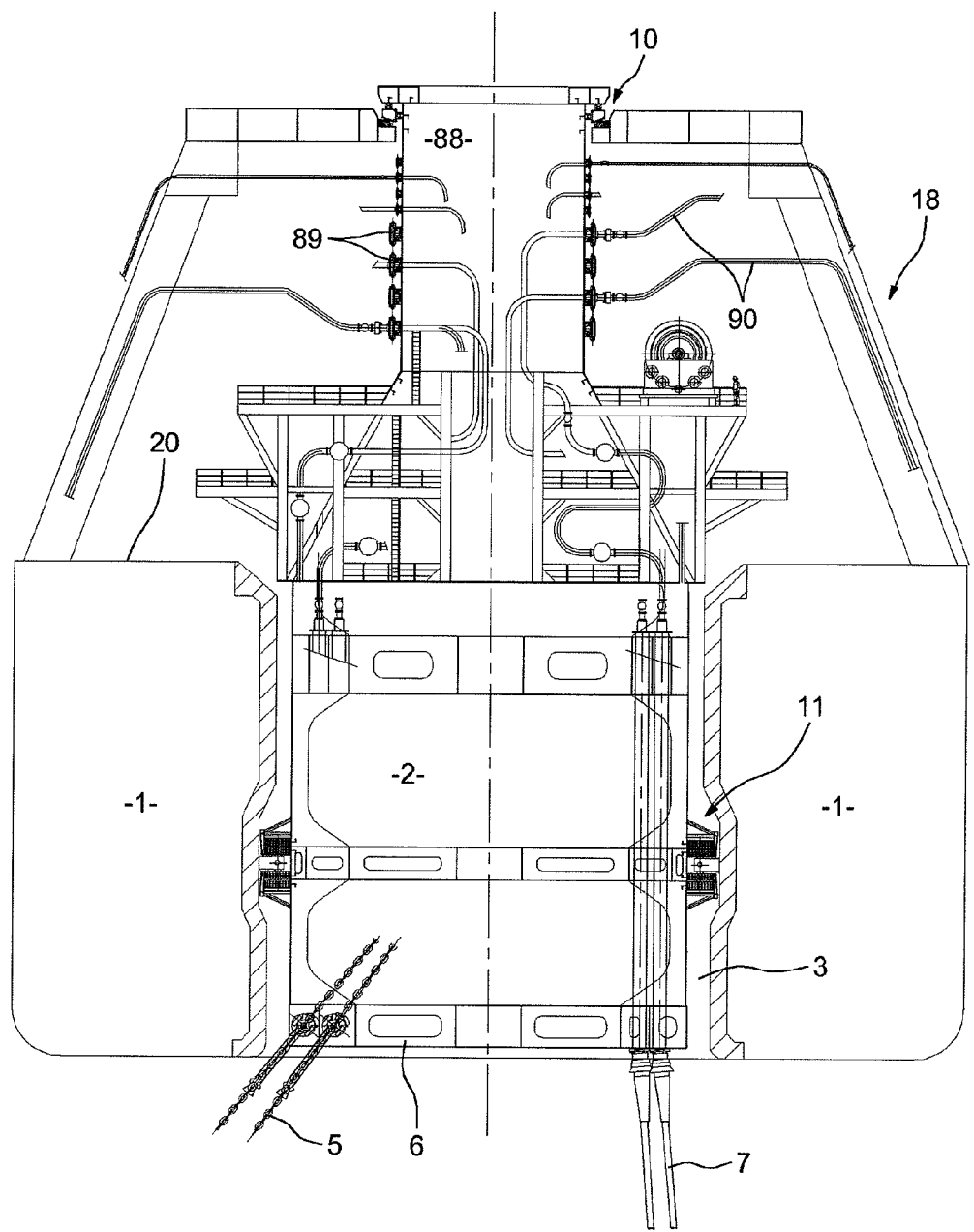
FIG. 4 is a similar view to FIG. 2A of another embodiment of the facility according to the invention.

FIG. 4 shows another embodiment of the facility according to the invention according to which the fluid transfer pipes 7 are no longer stored on conical platforms in coils but rise inside the turret into the cylindrical part of the head 88 which is then provided with a plurality of conventional fluid collecting rotary joints 89 in the form of collectors receiving several pipes and to each of which there is connected an outgoing pipe 90 towards the equipment of the vessel. FIG. 4, solely as an example, illustrates eight rotary joints of conventional type, i.e., with toroidal annular chambers, half of which form a stator part connected to the turret and the other half of which form the rotor part. As is illustrated these joints can be of different dimensions in relation to the flow rate and the fluids they are to convey. The upper bearing 10 in the example is of the type illustrated in FIG. 2E. It is ascertained that the assembly of pipes and their support are arranged underneath the bearing 10, whose diameter can be as small as necessary, even until the head of the turret has its hole covered, as is the case for example with the smooth swivel bearing in FIG. 2B.

Figure 5:
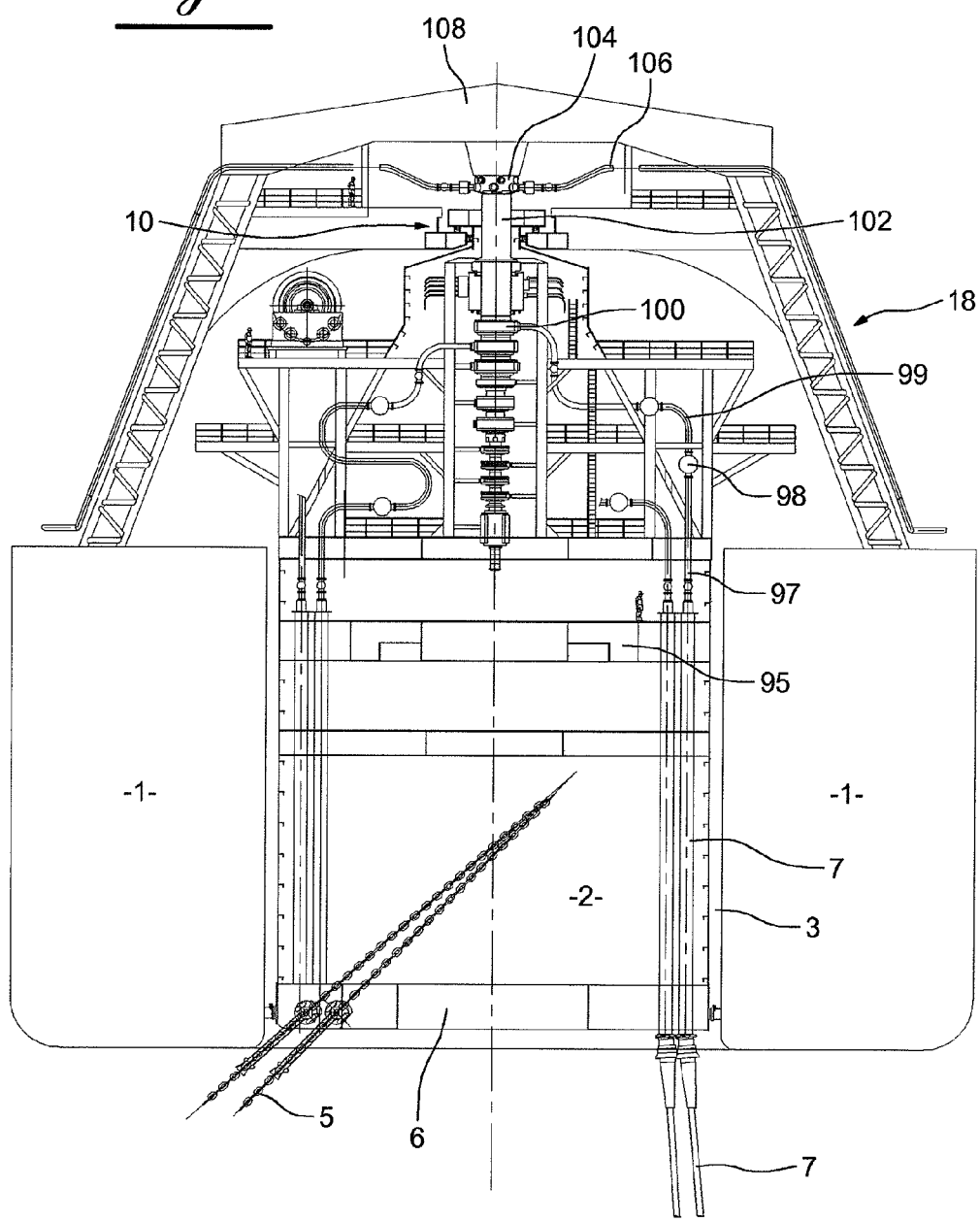
FIG. 5 is a similar view to FIG. 2A of another embodiment of the facility according to the invention.

FIG. 5 shows one embodiment of the invention in which, as in the case shown FIG. 4, the flexible pipes 7 are directed towards a support table 95 mounted inside the turret, and are then each connected to a rigid conduit 97 which extends to a valve 98 intended to receive several incoming conduits 97 and which only comprises one outgoing conduit 99. The valves thus inter-positioned therefore ensure a reduction in the number of pipes. Each outgoing conduit 99 is connected to a ring 100. The rings 100 in suitable number are axially superimposed, coaxial to the axis of the turret. In the ring device 100 an element is coaxially engaged forming a central hub 102 which extends axially towards the upper bearing 10 and ends above the bearing by a distribution ring 104 distributing fluid to outgoing conduits 106 which lead to the vessel's processing and storage equipment. The upper end of the hub 102 is secured to a construction forming the roof 108 mounted on the tower-shaped support structure 18 of the vessel, for example advantageously having three feet as illustrated in FIGS. 7 to 11.

In this embodiment, the upper bearing 10 maintains its reduced diameter despite the arrangement of the outgoing conduits 106 above the bearing, by means of the reduction in the number of pipes through the use of valves 98. And the bearing is again located above the assembly of the numerous pipes and conduits in the turret and above the support device, and is therefore better insulated from deformations of the hull.

Figure 6A:
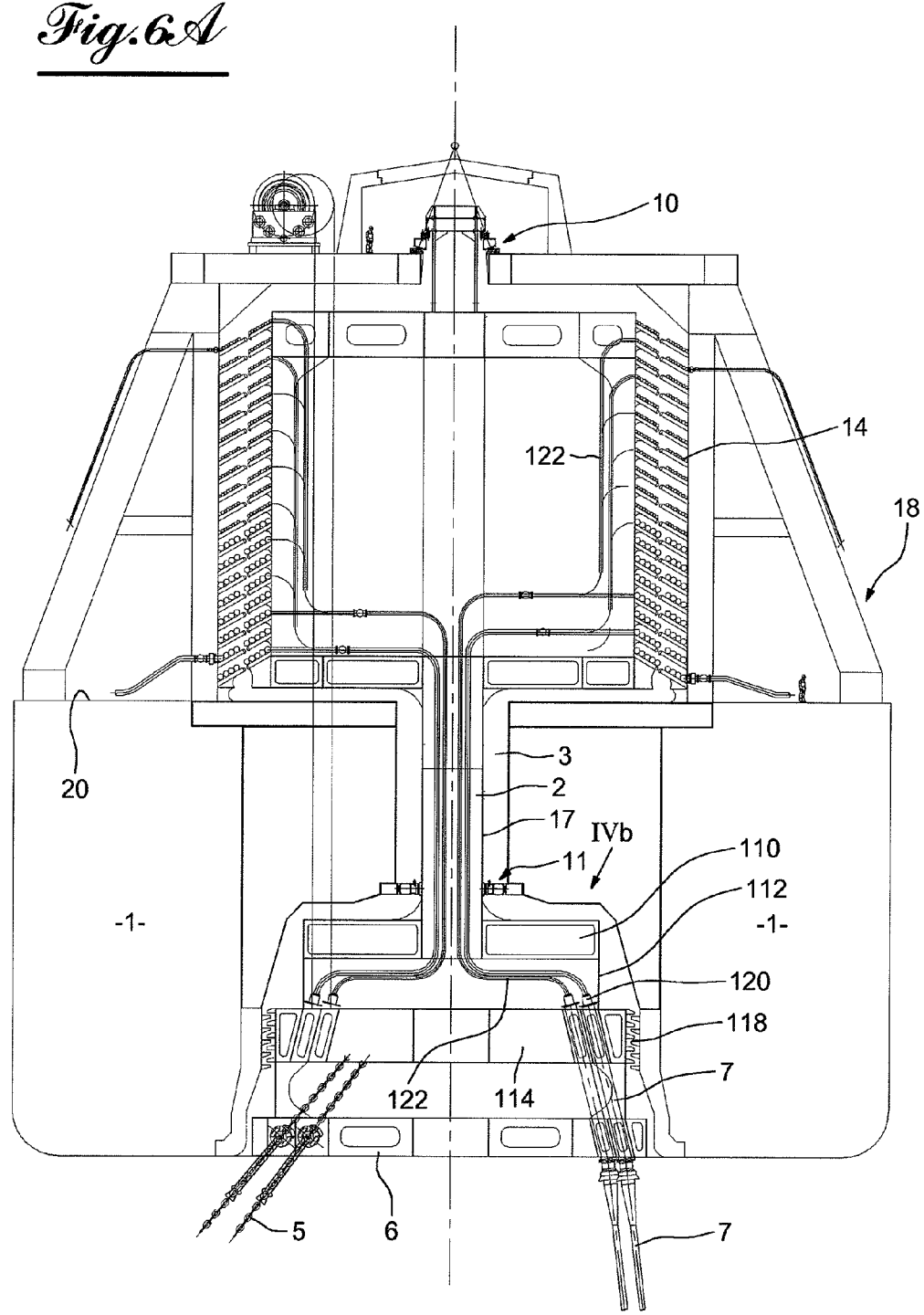
FIG. 6A is a similar view to FIG. 2A of yet another embodiment of the invention.
Figure 6B:
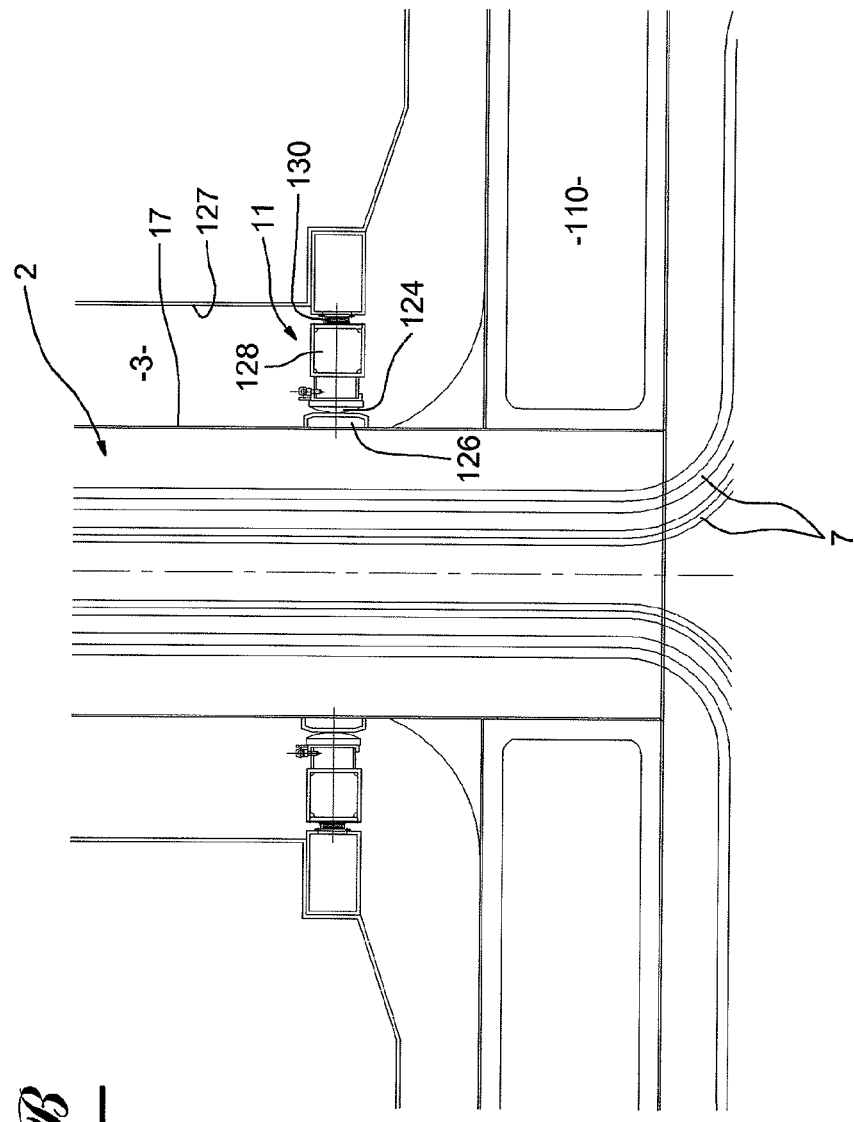
FIG. 6B is a view on a larger scale of the part indicated by the arrow VIB in FIG. 6A.

FIGS. 6A and 6B illustrate one embodiment of the invention in which upper part, above the upper deck 19 of the vessel, corresponds to the embodiment in FIG. 2A with an upper bearing of the type shown in FIG. 2E. The particularity of this embodiment is that the diameter of the lower bearing 11 is also of reduced size, however potentially of slightly larger diameter than the upper bearing. This bearing 11 is inserted between the surface of the shaft 3 and the outer peripheral surface 17 of the turret 2. The diameters of the shaft and of the turret are reduced accordingly at this level.

The turret part of reduced diameter extends downwards as far as a level between the lower and upper draught depth. At the base of the turret part of reduced diameter there is arranged a structure in the form of an annular caisson 110 which extends radially towards the outside and is engaged in a radially enlarged part 112 of the shaft. Underneath the caisson 110, and axially offset, the turret comprises a support table 114 for the flexible pipes 7 rising from the seabed, and a table for securing the anchor cables 5. The table 114 supporting the pipes 7 is located at the lower water level. Between this table and the wall of the shaft there is arranged a baffle device 118 intended to prevent pumping movements of the water in the shaft.

The flexible pipes 7 pass through the table 114 and are each connected via a flexible pipe head 120 to a rigid conduit 122. These conduits are configured so as to extend in the direction of the axis of the shaft and of the turret and then rise towards the upper part of the turret axially through the portion of reduced diameter thereof. This close arrangement in this part of the turret of reduced diameter is possible because the conduits are rigid and are positioned inside the turret by suitable support means, not illustrated. It is therefore only the lower part of the shaft and of the turret close to the keel which ensures the receiving of the flexible pipes 7 and it must therefore be a sufficiently large diameter to avoid any risk of contact between the pipes which must be able to move relative to one another without any risk of colliding and thereby becoming damaged.

This embodiment of the invention differing through the use of a lower bearing 11 also of reduced diameter, in combination with an upper bearing 10 also of reduced diameter has the advantage that, together with the upper bearing, it allows a reduction in the global resistance torque to rotation of the assembly, hence the possible use even of a bearing that is merely sliding and not necessarily bottom swivelling denoted 124 in FIG. 6B, and the possibility that it can be positioned very low which has the advantage of reducing the lever arms and hence the forces on this same bearing. The bearing 124 is arranged between a supporting projection 126 of the turret and a ring 128 which, on the radially outer side 127, bears upon the wall of the shaft via an elastomeric support 130.

It is to be noted that this arrangement would also be compatible with a conventional fluid collecting rotary joint provided that, between the rotary joint and the undersea pipes, the previously mentioned utilities are inter-positioned, pipe circulator utilities, collectors and flushing systems.

It follows from the foregoing that multiple possibilities of embodiment of the upper bearing 10 can be chosen. The bearing may advantageously be swivel mounted and of reduced diameter, even of zero inner diameter and smaller than the diameter of the pipe coils or of conventional rotary joints or the diameter of the shaft. The bearing may be a succession of sliding segments for example in the form of pads with spherical bearing. It may be a continuous sliding swivel of spherical bearing or formed of a roller bearing for example a ring of rollers with three raceways mounted on reinforced or sliding elastomeric pads. The bearing may made from a modular ring formed of an assembly of modules with recirculating rollers or it may be formed of superimposed plates carried by axles with elastically deformable wheels, e.g., with tyres.

With respect to the lower bearing 11, it is advantageously a vertically sliding radial bearing, or pure radial, which may optionally be formed by wheels such as illustrated in the figures as examples, by conventional sliding pads optionally equipped with a swivel support, e.g., in reinforced elastomer, by a ring of modules with recirculating rollers again in combination with reinforced elastomeric blocks. The pads may also be formed of a ring of modules of recirculating rollers mounted in a floating ring or mounted on devices with springs or jacks. The lower bearing 11 may be formed of rollers mounted radially or of bogies in which four wheels are mounted for example so as to form a vehicle. The bearing 11 could also be formed of tyres mounted radially and, to optimise the efficacy thereof, outer guide-ways could be provided doubling radial efficacy and reducing deflection.

FIGS. 7A, 7B and 8A and 8B show two advantageous embodiments of the support structure 18 of the facility according to the invention.

Figure 7A:
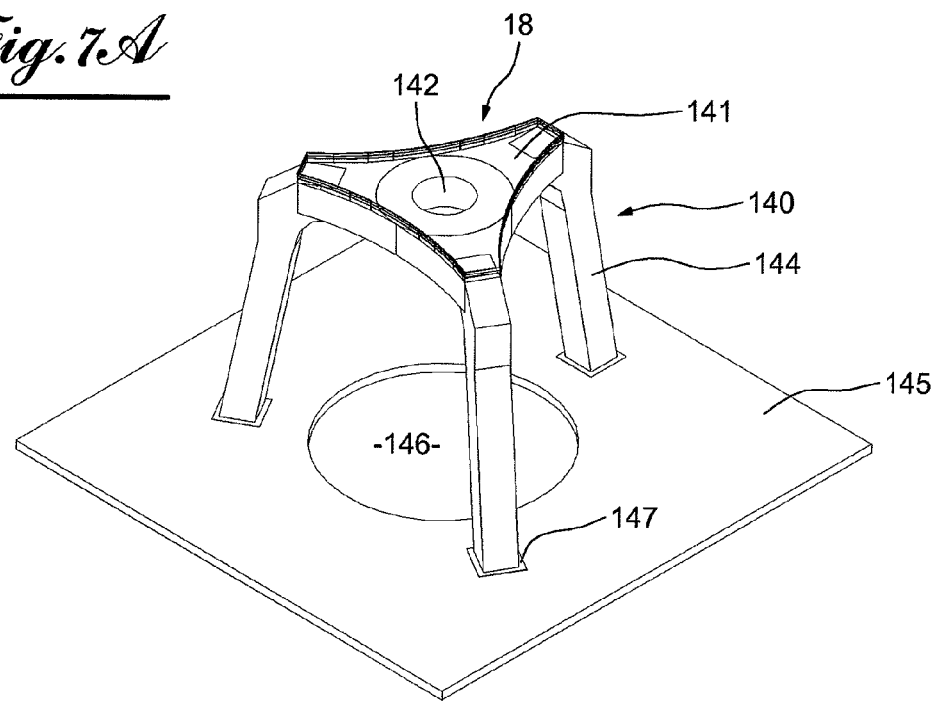
FIGS. 7A, 7B and 8A and 8B are respectively perspective and overhead views of two particular embodiments of a supporting device according to the invention.
Figure 7B:
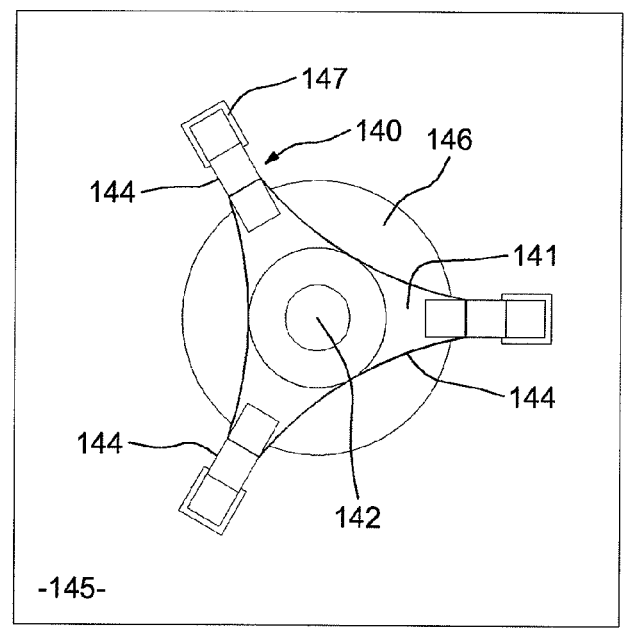

FIGS. 7A and 7B shows a carrier structure in the form of a tripod carrying reference 140. This tripod comprises an upper horizontal platform 141 which in its centre has a circular opening 142 allowing the passing of the head of the turret and whose edges give support to the upper bearing 10, and three feet 144 angled slightly away from each other from top to bottom and connecting the platform with a deck 145 of the floating storage and production unit, either the upper deck or an intermediate deck advantageously a deck located close to the mid-height of the vessel's' hull on the neutral axis where deformations are minimal, as illustrated by FIGS. 9 and 10.

The tripod structure 140 between its feet and above the connecting deck 145 clears an available volume adapted for the fluid transfer rotary system, either having superimposed platforms and coiled flexible pipes as shown for example in FIG. 2A and FIGS. 9 to 11, or of multi-passage rotary joint type with toroidal annular chambers conforming for example to FIG. 5 and FIG. 11.

The tripod structure 140 inasmuch as is necessary has substantial vertical rigidity by means of the foot sections adapted accordingly and the reduced lever arms of the upper structure through their appropriate angle of incline. The tripod structure is open, i.e., it does not close the cylindrical volume between the feet and thereby assists natural ventilation of the equipment installed underneath.

The tripod structure 140, adapted to the solution with the upper axial and radial bearing positioned above the fluid transfer device, has the advantage of three-point transfer of the vertical and horizontal loads onto the vessel's deck. The potential crushing of the deck is avoided for example through the use of reinforcing, vertical connecting metal sheet carrying the load through shear.

By means of these conditions the bending of the deck due to defoi nation of the vessel's hull generates the least amount of stress possible in the feet. With regard to possible out-of-round deformations at the edge of the hole 146 made in the deck to pass the turret, in the vicinity of which the three feet 144 are based, and in particular if distant from the neutral axis, the elevation of the feet themselves relative to the amplitude of radial deformation and the rigidities of the feet/deck and feet/horizontal structure connections, is adapted as is needed to the objective of reducing stresses in the structure, for example through structural design or via the inter-positioning of elastomeric elements at point 147.

The resistance to transverse forces of this structure can be reinforced if necessary by the adding of stays (not illustrated) or structures arranged laterally to the three feet.

Figure 8A:
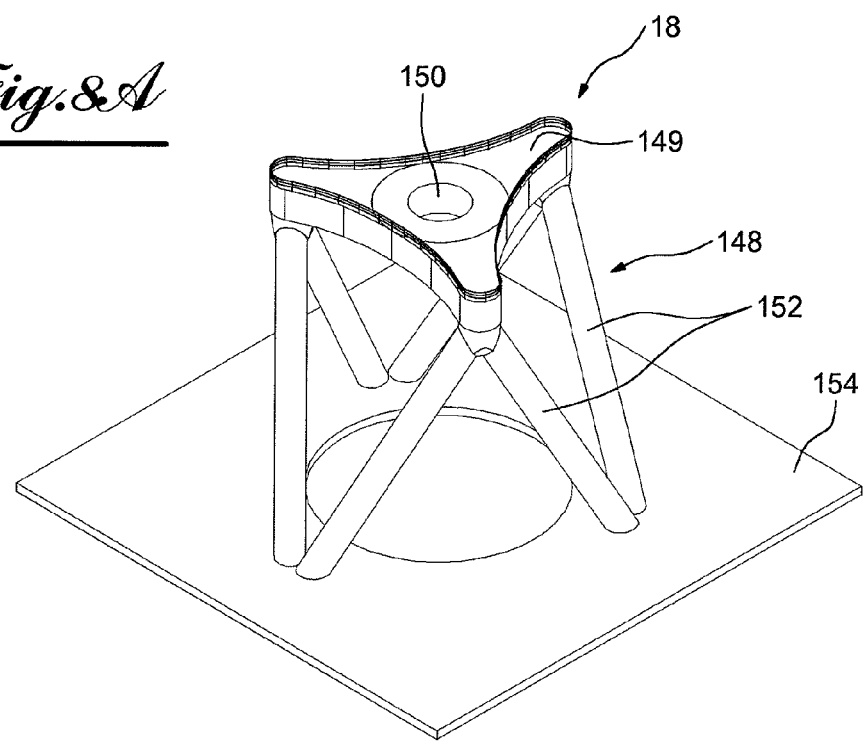
Figure 8B:
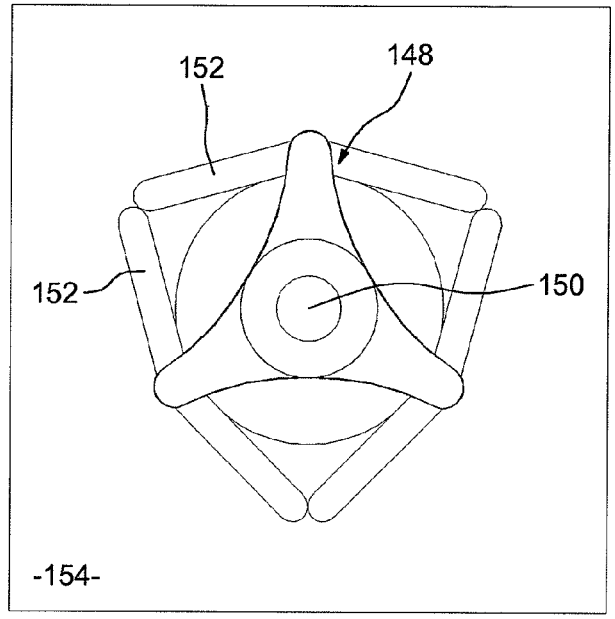

FIGS. 8A and 8B illustrate another version of embodiment of the support structure 18 of the upper bearing of the invention. In these figures, this structure is in the foam of a hexapod 148.

The upper part, in the form of a platform 149, with an opening 150 in the centre to pass the head of the turret, is connected by six feet 152 that are more angled than in the case shown in FIGS. 7A and 7B and arranged in pairs both at the upper platform 150 and at the deck 154 connecting to the hull of the floating unit. It is ascertained that, as in FIGS. 7A and 7B, the upper platform 149 is of general triangular shape. Each angle is connected to two close-lying foot ends. These feet extend obliquely towards the deck in opposite directions and bear upon the deck, each one just next to the bearing end of a foot connected to the adjacent angle of the platform.

The alignment points of the six feet in pairs at the top and bottom are alternately offset, alternating in a horizontal projection to pay heed in particular to the symmetry of the structure.

Therefore, at the top, the advantages of the tripod structure in FIGS. 7A and 7B are preserved, the number of feet connections being identical at the top and bottom. At the bottom of the hexapod, in the connection area to the vessel's deck, there are also the three areas corresponding to the joining of the six feet two by two.

As a result, the vertical deflections of the deck due to bending of the vessel's hull are essentially translated by a tilting movement of the upper platform, tolerated by the upper platform by means of its swivel function without any excessive stress in the feet.

With regard to out-of-round deformation, the three-foot behaviour is also maintained overall since two close-lying feet will have a very similar radial trajectory. Here again the rigidity of the feet/deck and feet/horizontal structure connection is adapted inasmuch as is necessary to the objective of reducing stresses in the structure, for example using a locally adapted structural design or by inter-positioning elastomeric elements acting as pseudo-swivels.

Finally, the hexapod structure, compared with the tripod structure, has better rigidity against horizontal forces potentially transmitted by the head of the turret, since the potential tilting of a triangular structure with downward tip, deemed to be non-deformable by nature, under the effect of horizontal forces which are perpendicular to it, will be corrected by the effect of the resistance of the two other opposite triangles.

FIGS. 9 and 10 illustrate two different versions of another embodiment of the invention which comprises a support structure 18 of tripod shape for example conforming to FIGS. 7A, 7B or hexapod shape conforming to FIGS. 8A, 8B.

In the facility shown in FIG. 9, the feet 144 or 152 of the support structure are connected to the neutral axis denoted 155 of the hull of the floating unit, to reduce deformations in particular out-of-round deformation at the three or six feet grouped two by two, and hence to reduce bending stresses generated in the feet.

As indicated in the foregoing, above the platform 141 or 149 of the tripod or hexapod structure, there is again the arrangement of the axial and radial upper bearing 10 having adequate swivel functions. This version corresponds to the facility in FIG. 2A with a device 12 supporting and receiving incoming the pipes 7, having conical storage platforms 15, 16 for storing coiled pipes, but whose feet 144 or 152 pass through the upper deck through appropriate cut-outs 157 for connection to the deck 155 positioned for this purpose close to the height of the neutral axis of the hull via vertical and horizontal metal sheet.

The version illustrated in FIG. 10 differs from the version in FIG. 9 essentially through the fact that the device 12 provided with platforms for storing coiled pipes is arranged in an upper part of the shaft of larger diameter 159 so that the platforms 141 or 149 of the support structures of tripod 140 or hexapod 148 shape lie at a lower level relative to the upper deck, compared with FIG. 9.

At the lower part of the turret, under the water line, there is again an assembly of blocks at 161 of sliding pad type, forming a segmented radial bearing. The illustrated arrangement is advantageous since the transmission of radial forces close to the anchor table 162 of the turret reduces the tilting moments and upper radial forces, whilst the swivel radial bearing provides freedom from the tilting stresses of the turret due to possible deformations of the hull, and finally the choice of basing the support structure in the immediate vicinity of the neutral axis of the hull reduces stresses due to out-of-round deformation in the connection areas of the feet of the support structure arranged for example as a tripod (feet 144) or hexapod (feet 152).

The invention claimed is:

1. A facility for producing and processing fluids including a floating vessel having a hull, the facility comprising:
    a rotating single-point mooring system including a turret pivotally mounted in an opening and having a shaft passing vertically through the hull of the floating vessel, which may be moored to the seabed and through which fluid transfer pipes pass towards the floating vessel, wherein
    the mooring system comprises devices for guiding the turret in the shaft and including axial bearing means and radial bearing means, and
    the turret comprises
        an upper part which includes a rotating device for receiving and supporting incoming fluid transfer pipes, and
        an upper bearing having a smaller diameter than the shaft and inter-positioned between a head portion of the upper part of the turret, and a support structure connected to the hull of the floating vessel, the upper bearing of the turret being located above the rotating device for receiving and supporting incoming fluid transfer pipes.

2. The facility according to claim 1, wherein the upper bearing is inter-positioned between a disc-shaped member of the head portion and a platform of the support structure of the vessel.

3. The facility according to claim 1, comprising a radial bearing located in the shaft, between an outer cylindrical peripheral surface of the turret and a wall delimiting the shaft.

4. The facility according to claim 1, wherein the upper bearing comprises a main interchangeable bearing and a temporary bearing functioning when the main bearing is out of service.

5. The facility according to claim 4, wherein the main interchangeable bearing and the temporary bearing are spaced radially apart, the temporary bearing being located radially outside the main interchangeable bearing.

6. The facility according to claim 4, the main interchangeable bearing and the temporary bearing are superimposed along an axis of the turret, the main interchangeable bearing being positioned uppermost of the main interchangeable and temporary bearings.

7. The facility according to claim 1, wherein the upper bearing is a sliding swivel allowing lateral tilting movement of the turret relative to a vertical axis.

8. The facility according to claim 1, wherein the upper bearing is a sliding bearing allowing lateral tilting movement of the turret relative to a vertical axis.

9. The facility according to claim 8, wherein the bearing is a single-piece ring including lifting jacks to remove the upper bearing for replacement.

10. The facility according to claim 1, wherein the upper bearing comprises a ring of modules with conical recirculating rollers=as an axial bearing, and a ring of modules with cylindrical recirculating rollers bearing on a cylindrical raceway as a radial bearing, and further including a swivel-forming ring supported by elastomeric pads on the support structure of the vessel and on which the rings of modules bear.

11. The facility according to claim 1, wherein the upper bearing comprises a ring of modules with conical recirculating rollers on a conical raceway, which bears upon the support structure of the vessel via elastomeric pads.

12. The facility according to claim 1, wherein
the upper bearing includes a plurality of rings superimposed in an axial direction of the shaft and elements moving on conical surfaces, and
lines orthogonal to the surfaces intersect at a point on the axis of the shaft, above the turret.

13. The facility according to claim 12, wherein the rings include modules with recirculating rollers.

14. The facility according to claim 13, wherein the rings include elastically deformable wheels with elastically deformable or pneumatic treads.

15. The facility according to claim 1, wherein
the device for receiving and supporting incoming fluid transfer pipes comprises annular platforms, each annular platform comprising a first platform element secured to the turret and a second platform element secured to the support structure of the vessel, on which the incoming transfer pipes are placed, and
the upper bearing is located above the first and second platform elements and above outgoing conduits towards the vessel.

16. The facility according to claim 1, wherein
the device for receiving and supporting the incoming transfer pipes comprises collector rotary joints to which the incoming fluid transfer pipes are connected and from which outlet conduits are directed towards the vessel, and
the upper bearing is located above the rotary joints and outlet conduits.

17. The installation according to claim 1, wherein the device for receiving and supporting incoming fluid transfer pipes comprises a system of valves reducing number of transfer pipes and a rotary joint device including first and second coaxial parts, the first coaxial part being secured to the turret and receiving outgoing conduits of the valve system, which are fewer in number than the incoming pipes, and the second coaxial part secured to the support structure of the vessel and to which are connected the outgoing conduits towards, and the upper bearing is arranged coaxially around the rotary joint part secured to the turret, below connections of the outgoing conduits.

18. The facility according to claim 3, wherein the radial bearing comprises rotational elements selected from the group consisting of elastically deformable wheels having axes extending parallel to the axis of the shaft and recirculating roller elements.

19. The facility according to claim 18, wherein
the rotational elements are wheels mounted on support posts secured to an inner surface of the shaft and in rolling contact with an outside surface of the turret, and
the turret comprises a raceway for the wheels that is coaxial to the outside surface of the turret.

20. The facility according to claim 3, wherein
the shaft has a reduced diameter above a location where the shaft receives the fluid transfer pipes,
the part of the turret which is engaged in the part of the shaft with reduced diameter has a reduced diameter accordingly, and
the radial bearing is of reduced diameter and inter-positioned between the reduced diameter parts of the shaft and of the turret.

21. The facility according to claim 3, wherein
the part of the shaft located above the part of the shaft receiving the transfer pipes is of reduced diameter,
the part of the turret which is engaged in the part of the shaft of reduced diameter is of reduced diameter,
the radial bearing is arranged between the reduced diameter parts of the shaft and the turret, and
the radial bearing is a sliding bearing.

22. The facility according to claim 1, wherein the support structure has three feet or six feet to accommodate deformations of the vessel=to which the support structure is attached.

23. The facility according to claim 22, wherein the support structure passes through an upper deck of the vessel without being attached thereto, and is secured proximate a median height of the hull of the vessel so that deformations are minimal.

* * * * *